US011777751B1

(12) United States Patent
Young

(10) Patent No.: US 11,777,751 B1
(45) Date of Patent: Oct. 3, 2023

(54) METHODS AND SYSTEMS FOR DECENTRALIZED CONSENSUS PROTOCOL IN TIMECHAIN NETWORKS

(71) Applicant: ANALOG ONE CORPORATION, Middletown, DE (US)

(72) Inventor: Victor Young, San Francisco, CA (US)

(73) Assignee: Analog One Corporation, Middletown, DE (US)

( * ) Notice: Subject to any disclaimer, the term of this patent is extended or adjusted under 35 U.S.C. 154(b) by 0 days.

(21) Appl. No.: 17/945,779

(22) Filed: Sep. 15, 2022

(51) Int. Cl.
*H04L 9/00* (2022.01)
*H04L 9/30* (2006.01)
*H04L 9/08* (2006.01)

(52) U.S. Cl.
CPC ............... *H04L 9/50* (2022.05); *H04L 9/088* (2013.01); *H04L 9/30* (2013.01)

(58) Field of Classification Search
None
See application file for complete search history.

(56) References Cited

U.S. PATENT DOCUMENTS

| 10,304,143 | B2* | 5/2019 | Kasper | G06Q 40/12 |
| 11,233,656 | B2 | 1/2022 | Karame | |
| 11,343,073 | B2 | 5/2022 | Oh | |
| 11,348,095 | B2 | 5/2022 | Fletcher | |
| 2020/0013027 | A1* | 1/2020 | Zhu | H04L 9/50 |
| 2020/0389312 | A1* | 12/2020 | Boneh | H04L 9/3239 |
| 2022/0029811 | A1 | 1/2022 | Boneh | |
| 2022/0044241 | A1 | 2/2022 | Lu | |

OTHER PUBLICATIONS

Xu, R. et al., Fairledger: a fair proof-of-sequential-work based lightweight distributed ledger for IoT networks. In 2022 IEEE International Conference on Blockchain (Blockchain) (pp. 348-355). IEEE. (Year: 2022).*
Wang, G., et al., Oct. 2019, Sok: Sharding on blockchain. In Proceedings of the 1st ACM Conference on Advances in Financial Technologies (pp. 41-61). (Year: 2019).*

* cited by examiner

*Primary Examiner* — Christopher J Brown
*Assistant Examiner* — Edward X Long
(74) *Attorney, Agent, or Firm* — Kanika Radhakrishnan; Evergreen Valley Law Group

(57) ABSTRACT

A proof of time (PoT) protocol implemented on a network of nodes to add a block to a timechain is provided. In order to participate in the consensus process, the nodes in the network have to stake a predefined number of tokens with the network. Further, the nodes have to register their participation keys with the network. Thereafter, the nodes of the network are classified into time nodes and time electors. Determination of the nodes which will serve as the time nodes and which will serve as the time electors is done by running a verifiable delay function (VDF) based on a ranking score and fixed stake of each node. The block is added to the timechain in a period called a slot. The network releases a random number called a seed that each node uses to compute VDF based on its ranking score and the fixed stake.

18 Claims, 7 Drawing Sheets

METHODS AND SYSTEMS FOR DECENTRALIZED CONSENSUS PROTOCOL IN TIMECHAIN NETWORKS

TECHNICAL FIELD

The present disclosure relates to timechain networks and more particularly to systems and methods related to a decentralized consensus protocol in the timechain networks such as proof of time (PoT).

BACKGROUND

Achieving consensus in decentralized applications is a decades-old problem. To date, the topic has yielded two categories of consensus protocols: classical consensus mechanisms that rely on all-to-all communication and the Nakamoto-type consensus that relies on mathematical proofs coupled with the longest chain rule. While classical consensus mechanisms can achieve high throughput and low latencies, they are not robust enough in addressing the centralization problem. This has relegated most of these protocols to operate largely on permissioned blockchains and static deployments.

On the other hand, the Nakamoto-type consensus protocols are robust but suffer from low throughputs and higher latencies. For example, users must wait for about an hour to confirm their transactions on the Bitcoin network. Under such an environment, users cannot be certain that their transactions will be confirmed and must trust the spender not to double-spend.

Blockchains prevent the double-spending problem by reaching a consensus on the ordered blocks of transactions. However, achieving this consensus in a decentralized setting is difficult because any node can act in a byzantine manner, jeopardizing the whole process.

The Nakamoto-type consensus protocols such as Proof of Work (PoW) address this problem by requiring miners to repeatedly compute hashes that expand the Blockchain where the longest chain is deemed authoritative. Because of the longest chain principle, the PoW consensus protocol ensures that byzantine nodes do not gain any advantage by creating pseudonyms.

The primary challenge regarding the operations of PoW-based blockchains such as Bitcoin is energy consumption. In recent times, generating a single block on the Bitcoin network requires a hash rate of nearly 174 exahash per second (EH/s), which results in huge electricity demands.

In addition, PoW-based networks suffer from low throughputs and higher latencies. Due to these challenges, proof of stake (PoS) protocols have emerged as alternatives to PoW protocols. In a PoS-enabled network, participants, also called validators, explicitly lock up their capital in the form of tokens into a smart contract to be allowed to propose or confirm blocks.

The staked tokens serve as collateral and can be burned or destroyed if the validator behaves lazily or dishonestly. While PoS is scalable, it has high barriers to entry since only the nodes that have staked the largest number of tokens are allowed to propose or confirm blocks to the ledger.

Additionally, PoW and PoS consensus protocols suffer from the forking problem, where two different chains with the same length can be generated, and neither one supersedes the other. Preventing this problem requires two disastrous sacrifices. First, the network must allow a reasonably large amount of time to grow the chain (e.g., 10 minutes in Bitcoin and 13 seconds in Ethereum 1.0). Second, applications must wait for several block confirmations to guarantee that their transactions will remain on the authoritative chain. For example, Bitcoin recommends six blocks, which means an application has to wait for nearly one hour for a transaction to be confirmed.

While PoS is certainly more advanced than PoW in terms of scalability and throughput, there is a need for an efficient consensus process to address decentralization and security.

SUMMARY

Various embodiments of the present disclosure describe methods and systems for a decentralized consensus protocol (such as proof of time (PoT)) in a time chain network.

In an embodiment, a computer-implemented method for a consensus process implemented in a timechain network is provided. The method includes determining, by a node in the network, whether the node is selected to participate in the consensus process as a time elector or time node based at least on a fixed stake and ranking score of the node upon receiving data in a network. The fixed stake is a predefined number of tokens submitted with the network to participate in the consensus process. The predefined number of tokens to be staked is equal for each node participating in the consensus process. The determination that the node is selected to participate as the time elector is performed by generating a verifiable delay function (VDF) proof based at least on a random seed, a ranking score, and the fixed stake of the node. Further, the method includes generating a block that has to be added to a timechain. The block includes the received data and current state of the timechain. Thereafter, the method includes communicating the block in combination with the VDF proof to other nodes in the network. The block is proposed by the node to be added to the timechain.

In another embodiment, a computer-implemented method for a consensus process implemented in a timechain network is provided. The method includes determining whether the node is selected to participate as a time elector or time node based at least on a fixed stake and ranking score of the node upon receiving data in a network. The stake is a predefined number of tokens submitted with the network to participate in the consensus process. The predefined number of tokens to be staked is equal for each node participating in the consensus process. The determination that the node is selected to participate as the time node is performed by generating a verifiable delay function (VDF) proof based at least on a random seed, ranking score, and the fixed stake of the node. Further, the method includes receiving a block in combination with a VDF proof from a time elector node in the network. The block and the VDF proof from the time elector node is verified based on a public key of the time elector node. Thereafter, the verified block is confirmed to be added to the timechain upon a successful verification.

BRIEF DESCRIPTION OF THE DRAWINGS

The following detailed description of illustrative embodiments is better understood when read in conjunction with the appended drawings. For the purpose of illustrating the present disclosure, exemplary constructions of the disclosure are shown in the drawings. However, the present disclosure is not limited to a specific device, or a tool and instrumentalities disclosed herein. Moreover, those in the art will understand that the drawings are not to scale.

Figure 1:
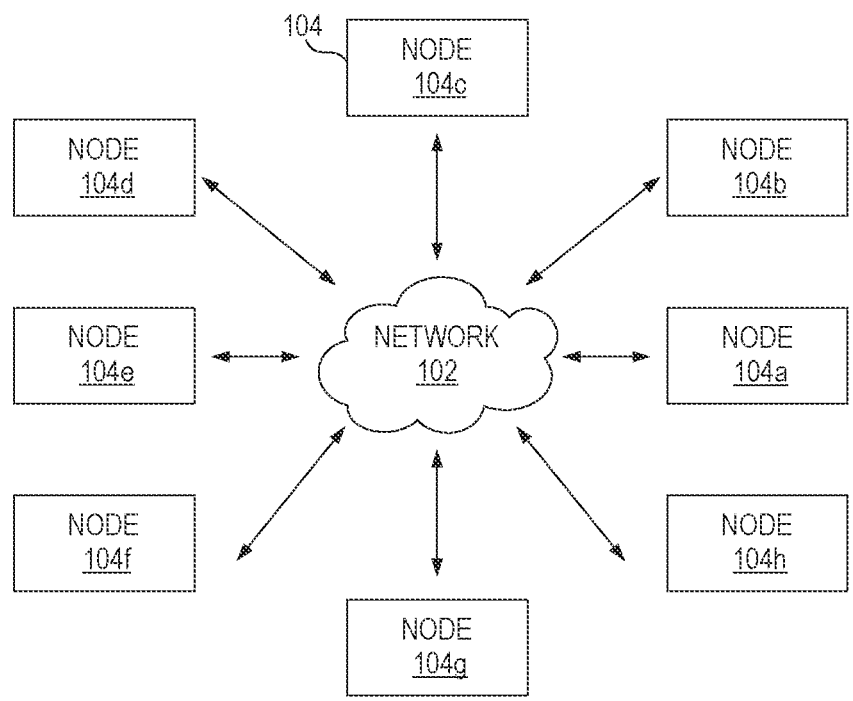
FIG. 1 is an illustration of an environment related to at least some embodiments of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Reference in this specification to "one embodiment" or "an embodiment" means that a particular feature, structure, or characteristic described in connection with the embodiment is included in at least one embodiment of the present disclosure. The appearances of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Overview

Various embodiments of the present disclosure describe methods and systems for a decentralized consensus protocol (i.e., proof of time (PoT)) in a timechain network.

A proof of time (PoT) protocol (i.e., method) to be implemented on a network of nodes to add a block to a timechain is provided. In order to participate in the consensus process, the nodes have to stake a predefined number of tokens with the network. Further, the nodes have to register their participation keys with the network. Thereafter, the nodes of the network are classified into time nodes and time electors for participation in consensus process for confirming transactions over the timechain network. The time electors are nodes that propose blocks to be added to the timechain. The time nodes are nodes that confirm the blocks to be added to the timechain. Determination of the nodes which will serve as the time nodes and which will serve as the time electors is done by running a verifiable delay function (VDF) based on a ranking score and fixed stake of each node. The block is added to the timechain in a period called a slot. 7200 slots constitute an epoch. The epoch is the time duration for which the network randomly determines which nodes will be the time electors and which nodes will be the time nodes in each slot. The network releases a random number called a seed for each slot that each node uses to compute VDF based on its ranking score and the fixed stake. A node is selected as the time elector to propose a block for a slot when the node computes VDF output and associated proof.

Whenever a user in the network submits data to be validated to the network, the time elector is selected to collate such data in a block. The time elector verifies the user's signature and generates VDF proof. The time elector broadcasts the data alongside the VDF proof to the time nodes for confirmation. A committee with multiple time nodes begins to confirm the block. Each node in the multiple time nodes verifies whether it has been selected as the time node before confirming the block. In addition to confirming the block, the time node checks whether the time elector was the one selected by the network to propose the block for that slot. The time node accepts the block after checking the VDF proofs, double-spending, overspending, and other problems with the block. When all the multiple time nodes have voted to accept or reject the block, the network triggers an end to the slot. If more than two third of the time nodes vote to accept the block, then the block is added to the timechain.

To participate in the above process of addition and confirmation of the block to the timechain, each node in the network has to generate and submit a participation key in the network. Each node has a stake and ranking score that are used to determine the probability that the node will be selected as a time elector or a time node. To provide a fair opportunity to each node in the network, only an equal amount of stake has to be made by all the nodes. No node can make the highest stake to increase the probability of selection.

PoT consensus protocol is environmentally-sustainable and provably decentralized and secure. Rather than validators investing in high computational resources or staking large sums of tokens to participate in the consensus process, they instead run a randomized process. Essentially, the randomized process selects one node that becomes a block proposer and 1,000 nodes that become block confirmers based on the fixed stake and the ranking score each possesses in the network.

Various embodiments of the methods and systems for decentralized consensus protocol (such as proof of time (PoT)) in a time chain network are further described with reference to FIG. 1 to FIG. 7.

FIG. 1 is an illustration of an environment 100 related to at least some embodiments of the present disclosure. In an embodiment, the environment 100 may depict a permissionless network 102 with multiple nodes 104a, 104b ... 104n (collectively referred to as a node 104) connected to manage a timechain or a distributed ledger (such as blockchain). Each node in the network may store an instance of the timechain. The timechain may include multiple blocks, where each block may include data in an encrypted form.

In one embodiment, the network 102 may include wired networks, wireless networks, and combinations thereof. Some non-limiting examples of the wired networks may include Ethernet, local area networks (LANs), fiber-optic networks, and the like. Some non-limiting examples of the wireless networks may include cellular networks like GSM/3G/4G/5G/LTE/CDMA networks, wireless LANs, Bluetooth, Wi-Fi or Zigbee networks, and the like. An example of a combination of wired and wireless networks may include the Internet.

Further, the network 102 may be a public network available for any node 104 to join and participate in a consensus process to validate transactions and data in the network 102. In one embodiment, the network 102 may receive event data (such as financial transactions, medical records, etc.) from an external source (not shown in FIG. 1) that needs to be stored in a distributed ledger (such as a timechain) managed by the network 102. In order to verify the event data and store the event data in the timechain, the network 102 implements the consensus protocol. Further, the network 102 can be a permissionless network that runs the consensus protocol to enable decentralization in the network 102. The network 102 is called decentralized because there is no single system keeping track of the blocks in the timechain and instead the timechain is distributed among the nodes 104a-104n connected to the network 102. For example, the network 102 can be a blockchain network, where the consensus protocol is used to validate and add a block to a blockchain.

In general, the network 102 allows a node 104 to verify the event data via cryptographic hash functions. The network 102 implements a consensus protocol referred to as Proof of Time (PoT) protocol. In PoT protocol, some of the nodes 104 are selected to participate in the consensus process. The consensus process is a process where the nodes 104 agree to meet certain requirements to verify and add a block to the timechain. The PoT protocol is explained in detail with reference to FIG. 3.

The network 102 may include wired networks, wireless networks, and combinations thereof. Some non-limiting examples of the wired networks may include Ethernet, local area networks (LANs), fiber-optic networks, and the like. Some non-limiting examples of the wireless networks may include cellular networks like GSM/3G/4G/5G/LTE/CDMA networks, wireless LANs, Bluetooth, Wi-Fi or Zigbee networks, and the like. An example of a combination of wired and wireless networks may include the Internet.

The node 104 can be a computing device associated with a user. The node 104 is configured to register with the network 102 before connecting to the network 102. In other words, the user associated with the node 104 has to register with the network 102 and may have to create an account with the timechain network provider. In one embodiment, the node 104 is installed with an application upon the registration to access the network 102. The user account may include a digital wallet to depict tokens acquired by the user.

The tokens are staked in the network 102 to participate in the consensus protocol to add or confirm a block to the timechain. The nodes 104a-104n connected to the network 102 may be self-selected as time nodes or time electors based on their fixed stake and a ranking score. The ranking score is a numerical measure that each node 104 in the network 102 accumulates when the node 104 proposes or confirms a block in the network accurately. Upon installation of the application associated with the network 102, the nodes 104a-104n may be configured to run a PoT protocol, which will be explained with reference to FIG. 2.

Figure 2:
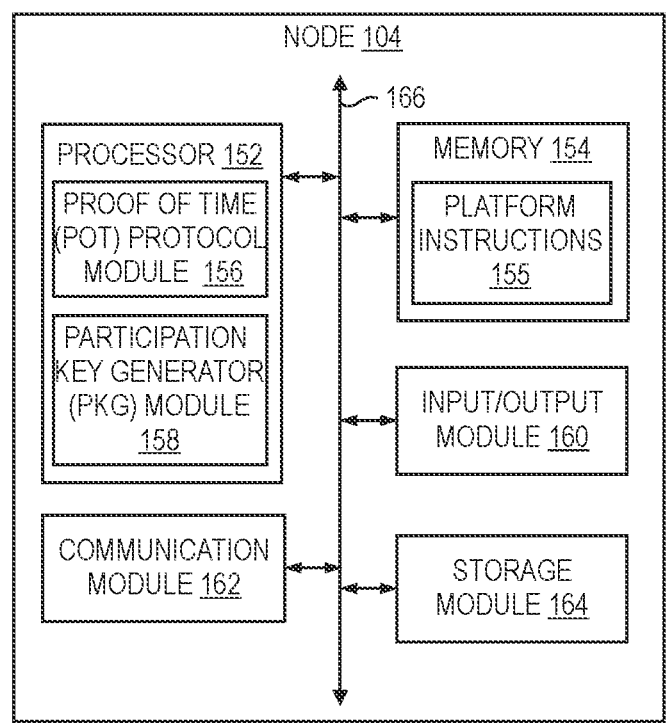
FIG. 2 is a block diagram of the node configured to run the PoT protocol, in accordance with an embodiment of the present disclosure.

FIG. 2 is a block diagram of the node 104 configured to run the PoT protocol, in accordance with an embodiment of the present disclosure.

The node 104 includes at least one processor, such as a processor 152 and a memory 154. It is noted that although the node 104 is depicted to include only one processor, the node 104 may include more number of processors therein. In an embodiment, the memory 154 is capable of storing machine-executable instructions, referred to herein as platform instructions 155. Further, the processor 152 is capable of executing the platform instructions 155. In an embodiment, the processor 152 may be embodied as a multi-core processor, a single-core processor, or a combination of one or more multi-core processors and one or more single-core processors. For example, the processor 152 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application-specific integrated circuit (ASIC), a field-programmable gate array (FPGA), a microcontroller unit (MCU), a hardware accelerator, a special-purpose computer chip, or the like. In an embodiment, the processor 152 may be configured to execute hard-coded functionality. In an embodiment, the processor 152 is embodied as an executor of software instructions, wherein the instructions may specifically configure the processor 152 to perform the algorithms and/or operations described herein when the instructions are executed.

The processor 152 is depicted to include a Proof of Time (PoT) protocol module 156, and a participation key generator (PKG) module 158. The modules of the processor 152 may be implemented as software modules, hardware modules, firmware modules, or as a combination thereof.

The memory 154 may be embodied as one or more volatile memory devices, one or more non-volatile memory devices, and/or a combination of one or more volatile memory devices and non-volatile memory devices. For example, the memory 154 may be embodied as semiconductor memories (such as mask ROM, PROM (programmable ROM), EPROM (erasable PROM), flash memory, RAM (random access memory), etc.), magnetic storage devices (such as hard disk drives, floppy disks, magnetic tapes, etc.), optical magnetic storage devices (e.g., magneto-optical disks), CD-ROM (compact disc read-only memory), CD-R (compact disc recordable), CD-R/W (compact disc rewritable), DVD (Digital Versatile Disc) and BD (BLU-RAY® Disc).

In at least some embodiments, the memory 154 stores logic and/or instructions, which may be used by modules of the processor 152, such as the PoT protocol module 156 and the PKG module 158, for implementing the PoT protocol. For example, the memory 154 includes logic for receiving event data from a network 102, determining whether the node 104 is selected to participate in consensus process by generating a VDF output and proof based at least on a random seed and a stake of the node 104, verifying the event data and collating the event data into a block, communicating the block to the network 102, and confirming the block by verifying the VDF proof and output, etc.

The node 104 further includes an input/output module 160 (hereafter referred to as an 'I/O module 160') and at least one communication module such as a communication module 162. In an embodiment, the I/O module 160 may include mechanisms configured to receive inputs from and provide outputs to the operator(s) of the node 104. To that effect, the I/O module 160 may include at least one input interface and/or at least one output interface. Examples of the input interface may include, but are not limited to, a keyboard, a mouse, a joystick, a keypad, a touch screen, soft keys, a microphone, and the like. Examples of the output interface may include, but are not limited to, a display such as a light-emitting diode display, a thin-film transistor (TFT) display, a liquid crystal display, an active-matrix organic light-emitting diode (AMOLED) display, a microphone, a speaker, a ringer, a vibrator, and the like. In an example embodiment, the processor 152 may include I/O circuitry configured to control at least some functions of one or more elements of the I/O module 160, such as, for example, a speaker, a microphone, a display, and/or the like. The processor 152 and/or the I/O circuitry may be configured to control one or more functions of the one or more elements of the I/O module 160 through computer program instructions, for example, software and/or firmware, stored on a memory, for example, the memory 154, and/or the like, accessible to the processor 152.

The communication module 162 may include communication circuitry such as for example, a transceiver circuitry including antenna and other communication media interfaces to connect to a communication network, such as the network 102 shown in FIG. 1. The communication circuitry may, in at least some example embodiments, enable reception of event data in a network 102, or from a publisher. The communication circuitry may further be configured to enable transmission of the proposed block to other nodes in the network 102 when the node is configured as a time elector.

The node 104 is further depicted to include a storage module 164. The storage module 164 is any computer-operated hardware suitable for storing and/or retrieving data. In one embodiment, the storage module 164 includes a repository for storing public keys of the nodes in the network, storing an instance of the timechain, and the current state of the timechain. The storage module 164 may include multiple storage units such as hard drives and/or solid-state drives in a redundant array of inexpensive disks (RAID) configuration. In some embodiments, the storage module 164 may include a storage area network (SAN) and/or a network-attached storage (NAS) system.

In some embodiments, the processor 152 and/or other components of the processor 152 may access the storage module 164 using a storage interface (not shown in FIG. 2). The storage interface may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 152 and/or the modules of the processor 152 with access to the storage module 164.

The various components of the node 104, such as the processor 152, the memory 154, the I/O module 160, the communication module 162, and the storage module 164 are configured to communicate with each other via or through a centralized circuit system 166. The centralized circuit system 166 may be various devices configured to, among other things, provide or enable communication between the components of the node 104. In certain embodiments, the centralized circuit system 166 may be a central printed circuit board (PCB) such as a motherboard, a main board, a system board, or a logic board. The centralized circuit system 166 may also, or alternatively, include other printed circuit assemblies (PCAs) or communication channel media.

Initially, the node 104 is installed with a timechain application also known as a decentralized application (dApp) to access the network (such as the network 102). A consensus protocol such as PoT protocol is provided to validate the transactions in the network 102. The node 104 is configured to function as a time elector or a time node to participate in the PoT protocol. The PoT protocol is divided into time slots (hereafter referred as slot), where each slot is associated with a block to be added to the timechain. The PoT protocol starts with publishers submitting event data to the network. The publishers can be computing nodes connected to the network. The event data can be at least one of financial transactions, medical records, etc. to be appended to a timechain upon verification. In order to append the event data to the timechain, the event data undergoes two stages such as soft voting and hard voting, which will be explained later with reference to FIGS. 4 and 5, respectively.

In one embodiment, the PKG module 158 is configured to generate a pair of participation keys (such as a public key and a private key) to participate in the consensus process. For example, the public key can be a signing key and the private key can be a validation key when the node 104 is participating as a time elector. In another example, the public key can be signing key and the private key can be a confirmation key when the node 104 is participating as a time node. In one example embodiment, the PKG module 158 is configured to generate a different pair of participating keys for each slot. In another example embodiment, the PKG module 158 is configured to use the pair of participation keys for a predefined number of slots.

Upon generation of the keys, the PoT protocol module 156 is configured to register the keys with the network for participation in the consensus process. The PoT protocol module 156 is configured to stake a number of tokens in the network to participate in the consensus process in addition to registering the participation keys.

The communication module 162 is configured to receive event data from the network 102. For example, the communication module 162 may receive a financial transaction between two accounts registered with the network 102. Further, the communication module 162 is configured to receive a slot for appending the event data to a timechain.

Upon reception of the event data, to participate in the consensus protocol, the PoT protocol module 156 is configured to self-select the node 104 as a time elector or a time node by running a weighted lottery algorithm based at least on the stake of the node 104. In one embodiment, the weighted lottery algorithm is performed using a ranking score of the node 104 in combination with the stake of the node 104. The ranking score is acquired by the node 104 based on the accuracy of the previous participations in the consensus process. During bootstrapping stage (i.e., when the network 102 is launched for the first time), the node 104 may not have acquired a ranking score, hence, the node 104 may be selected based on the stake which is equal for all the nodes, thereby leading to fair participation opportunity for each node registering to participate in the consensus process.

The PoT protocol module 156 is configured to determine a probability (ρ) for a node 104 being selected as a time elector or as a time node is given by an expression (1):

$$\rho = \sum_i \frac{fs(i) \cdot rs(i)}{S \cdot R} \quad (1)$$

where i is slot number, fs is fixed stake of a node, rs is a ranking score of the node, and S and R are the total stake and total ranking score of the nodes participating in the slot respectively.

The PoT protocol module 156 is configured to determine whether the node is selected to participate as a time elector or a time node in the consensus process. The time elector is a node that proposes a block to be added to the timechain, whereas the time node is a node that confirms the block to the timechain. In order to determine whether the node is selected to participate as a time elector or a time node, the PoT protocol module 156 is configured to determine a verifiable delay function (VDF) output and an associated proof based on at least an input and a random seed, where the input is derived from a node's stake and ranking score. The ranking score is assigned to a node based on the accuracy of its actions in prior participation in the consensus process. For example, if a node has erroneously proposed a block, the node will be given a low ranking score. Further, the PoT protocol module 156 is configured to check whether the VDF output is within a specified range. The specified range can be [0, Z], where Z depends on the stake and the node's ranking score.

The random seed is derived by the PoT protocol module 156 based on VDF output and VDF proof of a previous block added to the timechain. The random seed is available to the nodes in the network 102. Upon checking, the PoT protocol module 156 validates that the node 104 can participate in the consensus process either as a time elector or time node for adding a block to the timechain and holds proof for the same.

Node as Time Elector

When the node 104 is selected to participate as the time elector, the communication module 162 is configured to receive event data from the network 102. Upon receiving the event data, the PoT protocol module 156 is configured to verify the event data and collate the event data into a block. The collation of the event data may include hashing of the event data. Further, the PoT protocol module 156 signs the block with a signing key of the node 104.

The communication module 162 is configured to broadcast the block along with the VDF proof to other nodes in the network 102. For example, a transaction between a buyer and a seller is received as event data. The time elector verifies whether the transaction is valid and hashes the transaction details into a block. Further, the time elector signs the block with its signing key and broadcasts the block along with the VDF proof for the other nodes to verify whether the time elector was indeed the chosen one for proposing the block.

Node as Time Node

The communication module 162 is configured to receive the broadcasted block from a time elector. The PoT protocol module 156 may verify the signature of the block and the VDF proof to determine whether the time elector is indeed a valid proposer for the corresponding block. Upon verification, the PoT protocol module 156 in the time node may confirm that the block proposed by the time elector is a valid block. For example, a time elector may propose a block that is signed with its signing key and sent along with the VDF proof computed by the time elector. The time node upon receiving the proposed block verifies the block's signature by cross-checking the signing key with the stored signing keys of the nodes and verifies the VDF proof.

Figure 3:
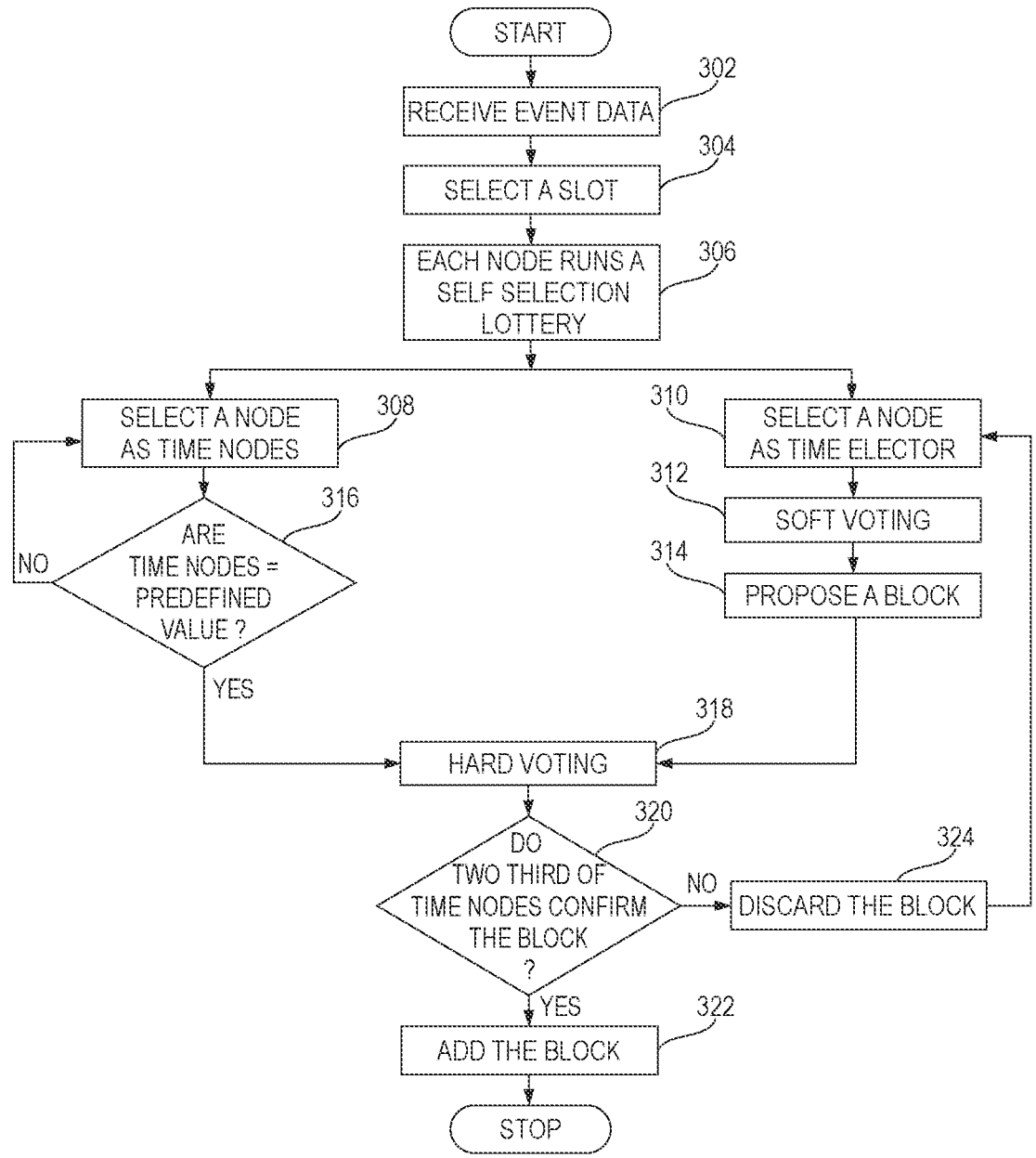
FIG. 3 depicts a process flow of proof of time (PoT) protocol that is implemented to add and confirm event data to a timechain, in accordance with an embodiment of the present disclosure.

FIG. 3 depicts a process flow 300 of proof of time (PoT) protocol that is implemented to add and confirm event data to a timechain, in accordance with an embodiment of the present disclosure. The PoT protocol is a decentralized consensus protocol where validators (such as time electors and time nodes) are selected based on ranking scores and fixed stake of the nodes. In a typical proof of stake (PoS) networks, the validators stake variable amounts of tokens and are selected proportionally based on the staked tokens to participate in the consensus protocol. However, in PoT protocol, each node may stake an equal number of tokens to participate in the consensus protocol of the timechain network, facilitating a fair opportunity for every node in the network irrespective of the tokens they possess.

The PoT protocol has two categories of nodes that participate in the consensus process such as time electors and time nodes. The time elector proposes blocks to be added to a distributed ledger (such as timechain or blockchain). The time node confirms the blocks to the ledger. The PoT consensus algorithm running on each node determines whether that node will serve as the time elector or as the time node by executing a verifiable delay function (VDF) based on each node's ranking score and fixed stake. A fixed stake is a staking process where all the nodes lock up an equal number of tokens to participate in the consensus process. A ranking score is a numerical measure that each node in the network accumulates when it proposes or confirms a block in the network. In PoT protocol, the ranking score of each node is computed in a decentralized manner based on the node's accuracy with which the node validates data and the other node's experience with the validating node.

When the network is initialized for the first time, all the nodes connected to the network may not have acquired a ranking score. In that case, the selection of the nodes to serve as the time elector or the time node is based on the fixed stake, thereby all the nodes have an equal chance to participate in the consensus process. In order to streamline the consensus process, the entire process is synchronized through the use of epochs. An epoch is a time duration in which it is determined which nodes will act as the time electors and which nodes will act as the time nodes. An epoch constitutes multiple slots, where the slot is a round in the consensus process where a time elector proposes a block, and time nodes confirm the block to the timechain. In order to add the block to the timechain, at least two third of the time nodes should confirm the block.

In general, all the nodes are expected to communicate over a synchronous network. Under such an environment, an honest time elector transmits hashed event data at the start of the slot, and all the other honest time nodes receive the messages at the end of the slot. Moreover, all hashed event data seen by an honest time node before the start of the slot is also seen by all the honest time nodes. However, the PoT process does not operate in such an idealized environment. In general, time nodes communicate in an asynchronous manner with no global clock or consistent clock rate. Each time elector/time node processes requests independently of others. Sometimes electors/time nodes have faster clock cycles while others are generally slow. To ensure seamless communication under such a setting, the PoT protocol partitions the network into 7,200 time slots (this is equivalent to one epoch). Each time elector/time node computes a VDF process and includes the VDF proof to the hashed event data at the beginning of each slot. Each VDF proof confirms that previous proofs existed and real-time has passed between the prior and the current proof, thereby the time electors/time nodes' clocks do not need to be synchronized.

In one example, the PoT consensus protocol is run on every node in a network that has registered to participate in the consensus process of adding a block to a timechain.

The PoT protocol is a chain of computations that allows the network to create immutable and verifiable event data. The protocol uses cryptographically secure functions that ensure that output cannot be predicted from the input. The PoT process starts with publishers submitting event data to the network. The event data undergoes two stages before the event data is appended to the timechain when a publisher submits the event data to the network. The two stages include soft voting and hard voting. During the soft voting, a time elector collates the submitted event data, verifies the signature of the publisher, and hashes the event data. Further, the time elector performs a verifiable delay function (VDF) computation and attaches the VDF proof to the hashed event data. Thereon, the time elector broadcasts the VDF proof along with the hashed event data to time nodes present in the network. Further, the soft voting performed by the time elector is explained later in reference to FIG. 4.

During the hard voting, the network generates a randomized consensus committee of 1000 time nodes to verify the signature of the time elector, submitted hashed event data, and the VDF proof. Further, the hard voting performed by the time nodes is explained later in reference to FIG. 5.

Referring to FIG. 3, the process flow 300 of the PoT protocol starts with the operation 302. At operation 304, the network 102 receives event data from a publisher. The publisher may be any node connected to the network that publishes event data. The event data may be transaction data between two accounts, medical records associated with a user, educational details of a user, and the like that can be stored in a timechain.

At operation 304, the network selects a slot to propose and validate a block to the timechain. The slot is a time duration during which a block is added to the timechain. Multiple slots constitute an epoch, in this case, one epoch includes 7200 slots. Out of the 7200 slots, the network then assigns the number of time slots based on the ratio of old nodes to new nodes in the network. A node is deemed new if it has never proposed any block or participated in the consensus process. Otherwise, if the node has validated or confirmed a block at least once, then the network characterizes it as an old node. For example, if the number of old nodes is 800 while the new nodes are 200, then the network will assign (0.8*7200=5760 slots) to old nodes while time nodes will get (0.2*7200=1440 slots). If there are no new nodes, the PoT algorithm running on each node assigns all the 7200 slots to old nodes. The new nodes are then assigned to the slots based on a fixed stake, while the old nodes are allocated to the remaining 5400 slots based on the fixed stake and ranking score.

At operation 306, the network selects nodes to be participated in the consensus process based at least on a stake and/or a ranking score using a lottery algorithm. In one embodiment, each node can execute the lottery algorithm to check whether the node is selected to participate in the consensus process.

At operation 308, a node is configured to determine that the node is selected as a time node to participate in the consensus process. At operation 310, the node is configured to determine that node is selected as a time elector to participate in the consensus process.

At operation 312, the time elector is configured to perform soft voting, which will be explained in detail with reference to FIG. 4. At operation 314, the time elector proposes a block upon performing soft voting. The time elector broadcasts the block to the nodes in the network.

At operation 316, the network determines whether the time nodes selected are equal to a predefined number. The PoT protocol is implemented on a pool of nodes selected to participate in the consensus process rather than all the nodes in the network. For example, the network determines whether at least 1000 time nodes are selected for the consensus process.

At operation 318, each of the time nodes receives a proposed block for that slot and each time node performs hard voting, which will be explained in detail with reference to FIG. 5. At operation 320, it is determined whether two third of the time nodes confirm the proposed block. In other words, the network determines whether 750 time nodes confirm the block and if confirmed, then the block is added to the timechain in operation 322, otherwise the block is discarded in operation 324.

Figure 4:
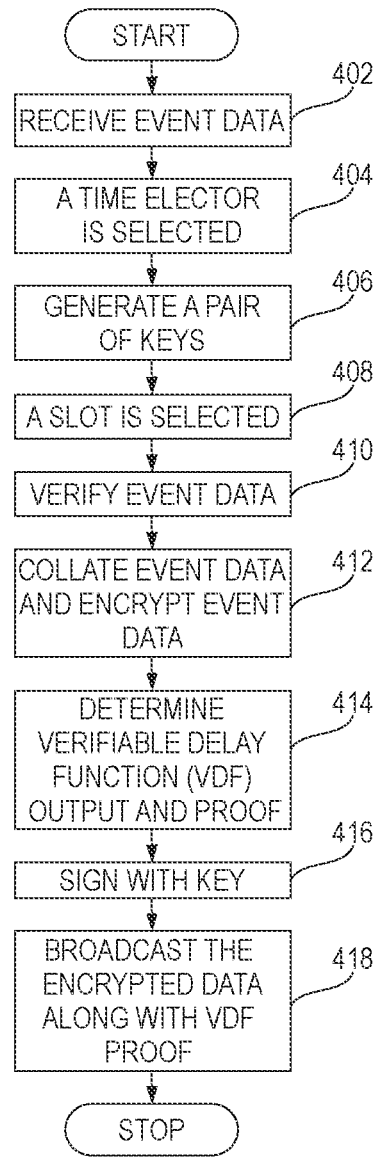
FIG. 4 represents a process flow of soft voting that is a part of the consensus process, in accordance with an embodiment of the present disclosure.

FIG. 4 represents a process flow 400 of soft voting that is a part of the consensus process, in accordance with an embodiment of the present disclosure. The soft voting is executed by the node selected to participate in the consensus process as a time elector.

At operation 402, the network receives event data from a publisher. The publisher can be a device connected to the network, which is configured to forward event data to the network. The event data may include transactions between two accounts, medical records, etc.

At operation 404, a node 102 is selected to participate as a time elector. The node is configured to self-select using a lottery algorithm based on stake and a ranking score of the node.

At operation 406, the node generates a pair of keys for participation in the consensus process. The pair of keys may include a public key and a private key, where the public key is shared with all the nodes in the network. To participate in the consensus process, the node is configured to submit the pair of keys with the network.

At operation 408, the network selects a slot during which the event data is added as a block to a timechain. In order to add the event data as the block to the timechain, the block has to be verified and a numerical function has to be proved. The nodes participating in the consensus process verify and validate the block to the added to the timechain.

At operation 410, the node verifies the event data received from the network. To that effect, the node verifies the signature of the publisher who has published the event data to the network. The publisher can be a node connected to the network. For example, the event data can be related to the transaction between two accounts, and the node verifies whether transaction includes valid account keys of the correct accounts.

At operation 412, the node collates the event data and hashes the event data to form a block using a hash function.

At operation 414, the node determines a verifiable delay function (VDF) output and proof to indicate that sufficient time has passed between the previous VDF proof and the current VDF proof, such that no node can falsely propose a block without computing the VDF output and proof. The VDF output and proof is determined based at least on the stake of the node and a ranking score of the node. Further, the VDF output and proof is determined based on a random seed derived from the VDF output and proof associated with a previous block added to the timechain.

At operation 416, the node signs the block with its public key. For example, the node 102 may sign the block with a signing key upon determination of the VDF output and the proof.

At operation 418, the node proposing the block for the selected slot, broadcasts the block along with the VDF output and proof to other nodes in the network for their validation. Once validated, the block is added to the timechain.

Figure 5:
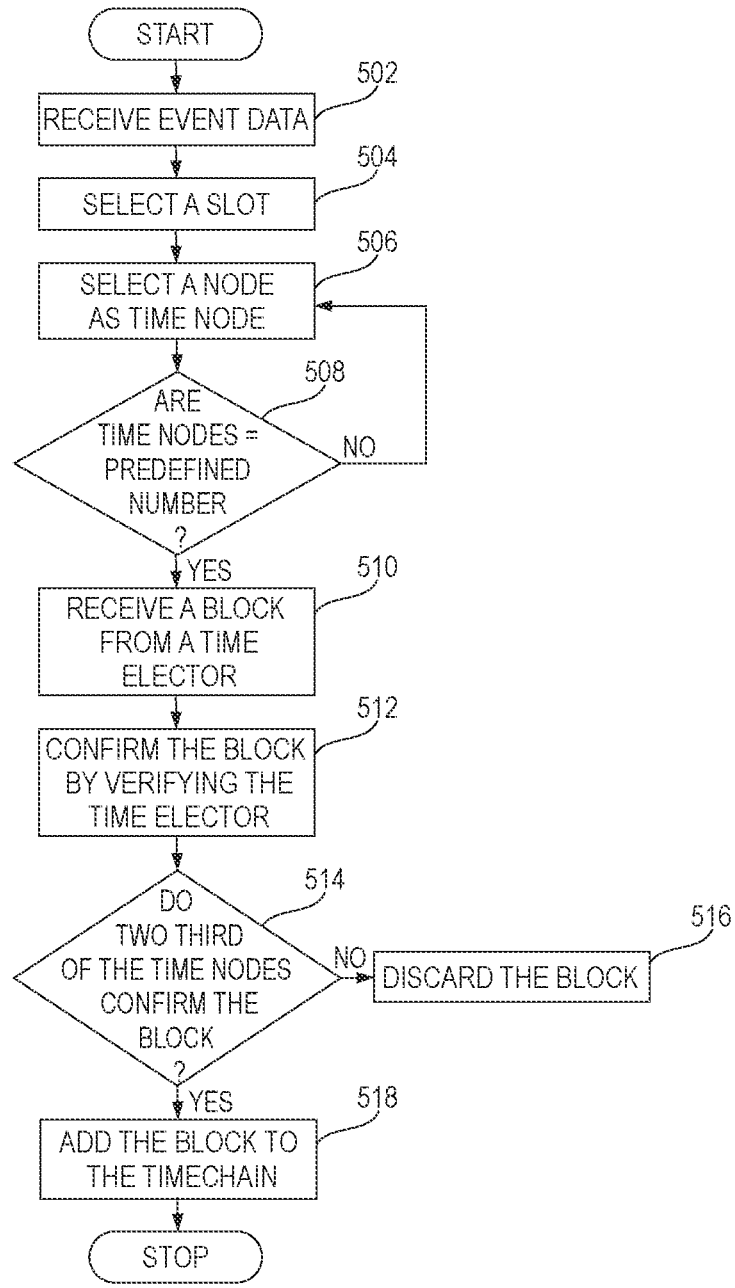
FIG. 5 represents a process flow of hard voting that is a part of the consensus process, in accordance with an embodiment of the present disclosure.

FIG. 5 represents a process flow 500 of hard voting that is a part of the consensus process, in accordance with an embodiment of the present disclosure. The hard voting is executed by the node selected to participate in the consensus process as a time node.

At operation 502, the network receives event data from a publisher. The publisher can be a device connected to the network, which is configured to forward event data to the network. The event data may include transactions between two accounts, medical records, etc.

At operation 504, the network selects a slot during which the event data is added as a block to a timechain. In order to add the event data as the block to the timechain, the block has to be verified and a numerical function has to be proved. The nodes participating in the consensus process verify and validate the block to the added to the timechain.

At operation 506, a node is selected to participate as a time node. The node is configured to self-select using a lottery algorithm based on stake and a ranking score of the node.

At operation 508, the network checks whether the time nodes selected are equal to a predefined number. For example, the network checks whether thousand nodes are selected as time nodes. If the time nodes are not equal to the predefined number, the process moves to operation 506 for the selection of an adequate number of time nodes.

At operation 510, the time nodes receive a block proposed by the time elector in the network for the selected slot. Each time node may receive the block individually. The block includes signature, event data, and VDF proof of the time elector node.

At operation 512, each time node is configured to confirm the block by verifying the signature and VDF proof of the block. To that effect, the time node verifies by matching the public key used in the signature to the public keys stored in the time node. Further, each time node verifies whether the time elector is a valid proposer of the block for the slot based on the VDF proof.

At operation 514, the network checks whether two third of the total number of time nodes confirmed the block. For example, the network checks whether two third of the time nodes verified that time elector is the valid proposer and the event data is valid.

At operation 516, the block proposed by the time elector is discarded if two third of the time nodes vote against the block. For example, the block is discarded if more than two third of the time nodes could not verify and validate the event data and time elector node.

At operation 518, the block is added to the timechain if two third of the time nodes confirm the block. The signatures of the time nodes are appended to the block before being added to the timechain. Further, the current state of the timechain is changed to the current block being added to the timechain.

Figure 6:
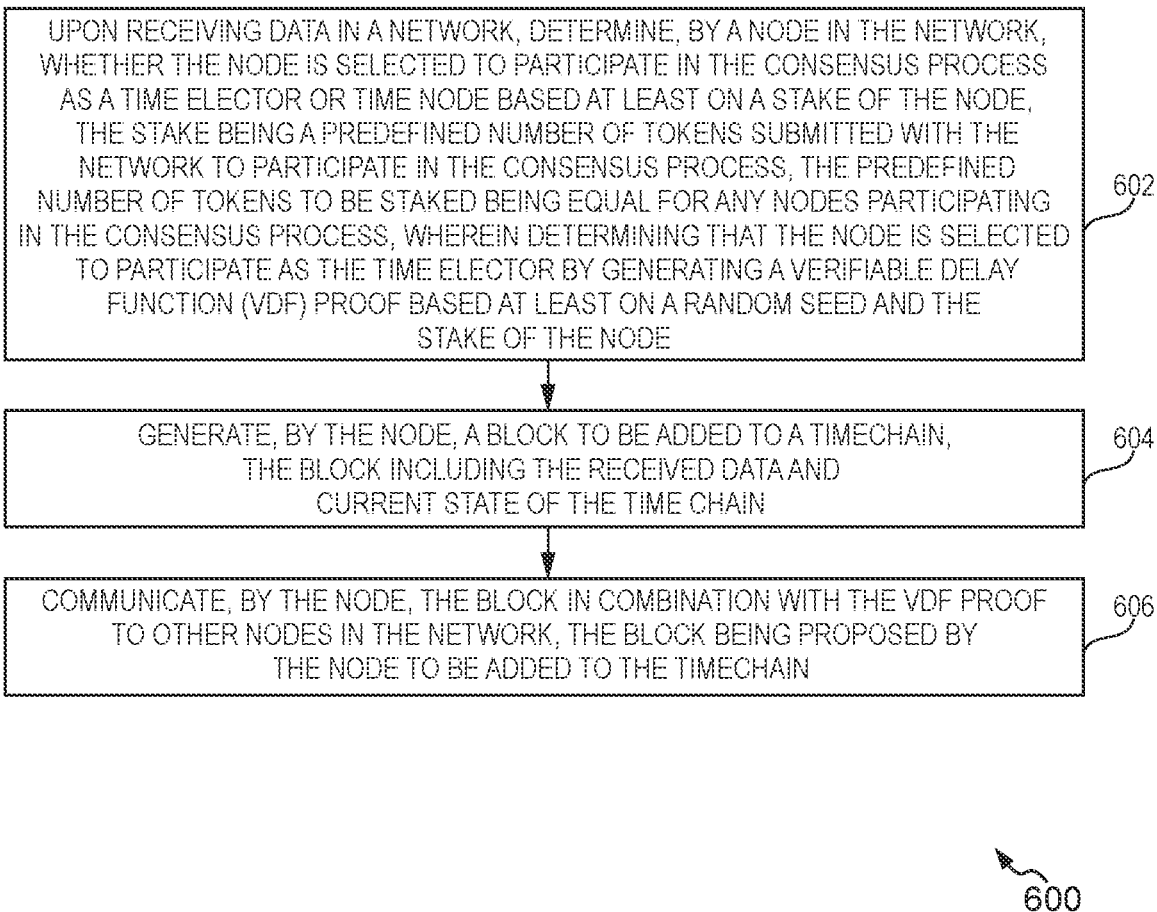
FIG. 6 represents a flow diagram depicting a method for implementing a consensus process in a timechain network, in accordance with an embodiment of the present disclosure.

FIG. 6 represents a flow diagram depicting a method 600 for implementing a consensus process in a timechain network, in accordance with an embodiment of the present disclosure. The method 600 depicted in the flow diagram may be executed by a time elector. Operations of the method 600 and a combination of operations in the flow diagram, may be implemented by, for example, hardware, firmware, a processor, circuitry, and/or a different device associated with the execution of software that includes one or more computer program instructions. The method 600 starts at operation 602.

At operation 602, upon receiving data in a network, the node determines whether the node is selected to participate in the consensus process as a time elector or time node based at least on a stake of the node. The stake is a predefined number of tokens submitted with the network to participate in the consensus process. The predefined number of tokens to be staked is equal for any nodes participating in the consensus process. The determination that the node is selected to participate as the time elector by generating a verifiable delay proof is based at least on a random seed and the stake of the node.

At operation 604, the node generates a block to be added to a timechain. The block includes the received data and current stake of the timechain.

At operation 606, the node communicates the block in combination with the VDF proof to other nodes in the network. The block is proposed by the node to be added to the timechain.

Figure 7:
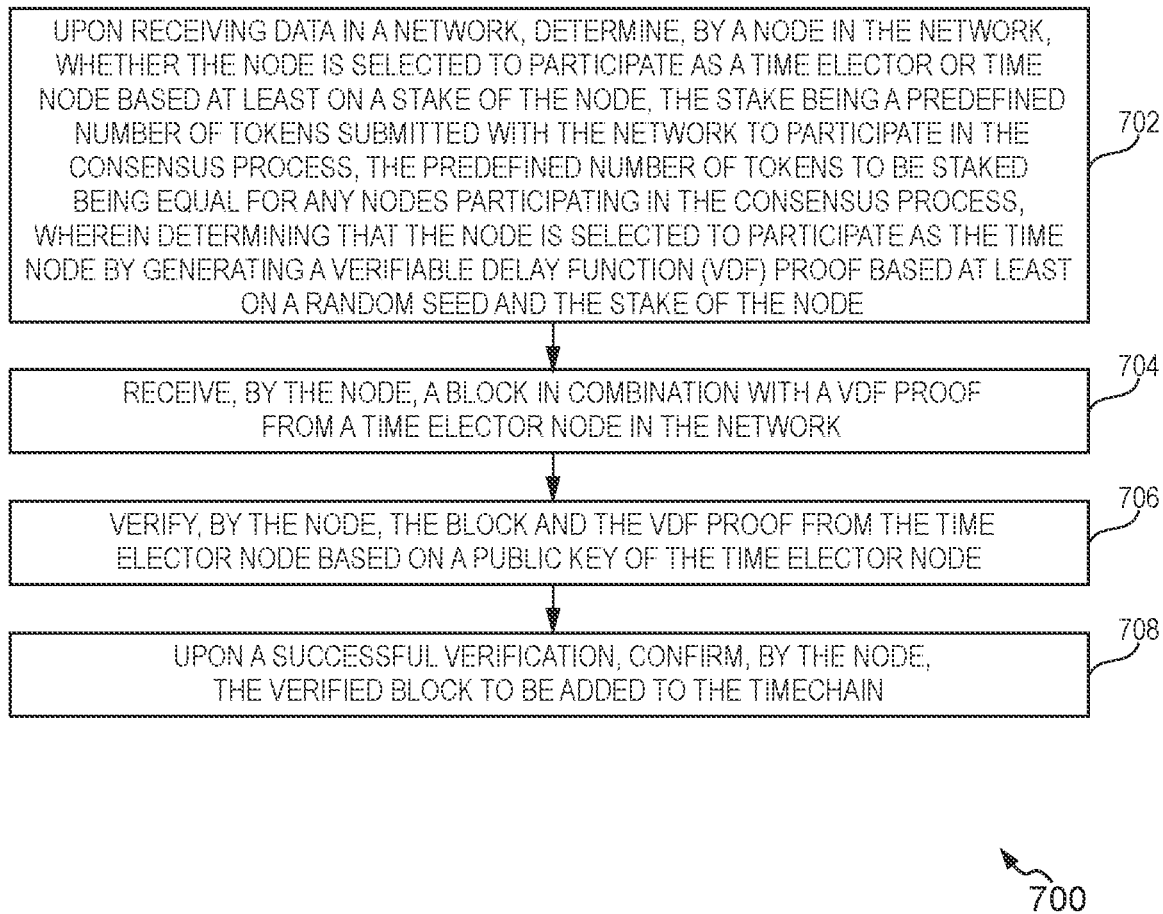
FIG. 7 represents a flow diagram depicting a method for implementing a consensus process in a timechain network, in accordance with an embodiment of the present disclosure.

FIG. 7 represents a flow diagram depicting a method 700 for implementing a consensus process in a timechain network, in accordance with an embodiment of the present disclosure. The method 700 depicted in the flow diagram may be executed by a time elector. Operations of the method 700 and a combination of operations in the flow diagram, may be implemented by, for example, hardware, firmware, a processor, circuitry, and/or a different device associated with the execution of software that includes one or more computer program instructions. The method 700 starts at operation 702.

At operation 702, upon receiving data in a network, the node determines whether the node is selected to participate in the consensus process as a time elector or time node based at least one a stake of the node. The stake is a predefined number of tokens submitted with the network to participate in the consensus process. The predefined number of tokens to be staked is equal for any nodes participating in the consensus process. The determination that the node is selected to participate as the time node by generating a verifiable delay proof is based at least on a random seed and the stake of the node.

At operation 704, the node receives a block in combination with a VDF proof from a time electro node in the network.

At operation 706, the node verifies the block and the VDF proof from the time elector node based on a public key of the time elector node.

At operation 708, upon successful verification, the node confirms the verified block to be added to the timechain.

The disclosed methods with reference to FIGS. 3-7, or one or more operations of the flow charts 300, 400, and 500, and flow diagrams 600 and 700 may be implemented using software including computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components)) and executed on a computer (e.g., any suitable computer, such as a laptop computer, netbook, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such networks) using one or more network computers. Additionally, any of the intermediate or final data created and used during the implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such a suitable communication means includes, for example, the Internet, the World Wide Web, an intranet, software applications, cable (including fiber optic cable), magnetic communications, electromagnetic communications (including RF, microwave, and infrared communications), mobile communications, or other such communication means.

Various embodiments of the present disclosure provide a proof of time (PoT) consensus protocol which is more decentralized than PoW or PoS consensus protocols. Further, PoT does not require validators to expend large amounts of energy, as with PoW-based protocols, or stake large sums of tokens in PoS-based networks. Any node can join the network and participate in the consensus process, provided the node has accumulated a sufficient ranking score and has staked an equal amount of tokens in the system. It is inherently more secure than PoW or PoS. By leveraging the fixed stake and a ranking score, PoT makes the Timechain secure by incentivizing proper validation and disincentivizing improper ones. Validators can only earn a portion of the transaction fees and increase their ranking scores if they approve transactions correctly. However, they lose the stake, and their ranking scores are degraded when they confirm fraudulent transactions. In this regard, misbehavior by a validator jeopardizes its future participation in the consensus process because of a downgraded ranking score and potential loss of revenue.

Various embodiments of the disclosure, as discussed above, may be practiced with steps and/or operations in a different order, and/or with hardware elements in configurations, which are different than those which, are disclosed. Therefore, although the disclosure has been described based upon these exemplary embodiments, it is noted that certain modifications, variations, and alternative constructions may be apparent and well within the spirit and scope of the disclosure.

Although various exemplary embodiments of the disclosure are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A computer-implemented method for a consensus process implemented in a timechain network, comprising:
    receiving, by a node in a network, event data from the network, the event data being sent to the network by a publisher;
    verifying, by the node, the event data by validating a signature of the publisher;
    determining, by the node, whether the node is selected to participate in the consensus process as a time elector or time node based at least on a stake of the node, the stake being a predefined number of tokens submitted with the network to participate in the consensus process, the predefined number of tokens to be staked being equal for any nodes participating in the consensus process,
    wherein determining that the node is selected to participate as the time elector by generating a verifiable delay function (VDF) proof based at least on a random seed and the stake of the node;
    generating, by the node, a block to be added to a time chain, the block comprising the received data and current state of the time chain; and
    communicating, by the node, the block in combination with the VDF proof to other nodes in the network, the block being proposed by the node to be added to the timechain.

2. The method of claim 1, further comprising:
    acquiring, by the node, a ranking score based on previous participation in the consensus process; and
    generating, by the node, the VDF proof further based on the ranking score of the node.

3. The method of claim 1, further comprising:
    generating, by the node, a pair of participation keys to participate in the consensus process;
    registering, by the node, the pair of participation keys to the network indicating the participation in the consensus process; and
    signing, by the node, the block with one of the pair of participation keys.

4. The method of claim 1, wherein generating the VDF proof comprises:
    generating an output and the associated VDF proof based on an input and the random seed, wherein the input is derived from a fixed stake and a ranking score of the node; and
    verifying that the generated output is within a predefined range.

5. The method of claim 1, wherein the random seed is derived from a VDF output and proof of a previous block added to the timechain.

6. A computer-implemented method for a consensus process implemented in a timechain network, comprising:
    upon receiving event data in a network, determining, by a node in the network, whether the node is selected to participate as a time elector or time node based at least on a stake of the node, the stake being a predefined number of tokens submitted with the network to participate in the consensus process, the predefined number of tokens to be staked being equal for any nodes participating in the consensus process,
    wherein determining that the node is selected to participate as the time node by generating a verifiable delay function (VDF) proof is based at least on a random seed and the stake of the node;
    receiving, by the node, a block in combination with a VDF proof from a time elector node in the network;
    verifying, by the node, the block and the VDF proof from the time elector node based on a public key of the time elector node; and
    upon a successful verification, confirming, by the node, the verified block to be added to the timechain.

7. The method of claim 6, further comprising:
acquiring, by the node, a ranking score based on previous participations in the consensus process; and
generating, by the node, the VDF proof further based on the ranking score of the node.

8. The method of claim 6, further comprising:
generating, by the node, a pair of participation keys to participate in the consensus process;
registering, by the node, the pair of participation keys to the network indicating the participation in the consensus process; and
signing, by the node, the verified block with one of the pair of participation keys.

9. The method of claim 6, wherein the block is added to the timechain when at least two third of time nodes confirm the block.

10. The method of claim 6, wherein the consensus process is divided into multiple slots, a slot being a round in which a block is verified and added to the timechain.

11. A node for a consensus process implemented in a timechain network, comprising:
a processor;
a communication module; and
a memory for storing instructions which, when executed by the processor, causes the node, at least in part, to:
receive event data from a network, the event data being sent to the network by a publisher;
verify the event data by validating a signature of the publisher;
determine whether the node is selected to participate in the consensus process as a time elector or a time node based at least on a stake of the node, the stake being a predefined number of tokens submitted with the network to participate in the consensus process, the predefined number of tokens to be staked being equal for any nodes participating in the consensus process,
wherein determination is performed by generating a verifiable delay function (VDF) proof based at least on a random seed and the stake of the node;
generate a block to be added to a time chain, the block comprising the received data and current state of the time chain; and
communicate the block in combination with the VDF proof to other nodes in the network, the block being proposed by the node to be added to the timechain.

12. The node of claim 11, wherein the node is further caused, at least in part, to:
acquire a ranking score based on previous participation in the consensus process; and
generate the VDF proof further based on the ranking score of the node.

13. The node of claim 11, wherein the node is further caused, at least in part, to:
generate a pair of participation keys to participate in the consensus process;
register the pair of participation keys to the network indicating the participation in the consensus process; and
sign the block with one of the pair of participation keys.

14. The node of claim 11, wherein to generate the VDF proof, the node is caused, at least in part, to:
generate an output and the associated VDF proof based on an input and the random seed, wherein the input is derived from a fixed stake and a ranking score of the node; and
verify that the generated output is within a predefined range.

15. A node for a consensus process implemented in a timechain network, comprising:
a processor;
a communication module; and
a memory for storing instructions which, when executed by the processor, causes the node, at least in part, to:
upon reception of event data in a network, determine whether the node is selected to participate as a time elector or time node based at least on a stake of the node, the stake being a predefined number of tokens submitted with the network to participate in the consensus process, the predefined number of tokens to be staked being equal for any nodes participating in the consensus process,
wherein determination is performed by generating a verifiable delay function (VDF) proof based at least on a random seed and the stake of the node;
receive a block in combination with the VDF proof from a time elector node in the network;
verify the block and the VDF proof from the time elector node based on a public key of the time elector node; and
upon a successful verification, confirm the verified block to be added to the timechain.

16. The node of claim 15, wherein the node is further caused, at least in part, to:
acquire a ranking score based on previous participations in the consensus process; and
generate the VDF proof further based on the ranking score of the node.

17. The node of claim 15, wherein the node is further caused, at least in part, to:
generate a pair of participation keys to participate in the consensus process;
register the pair of participation keys to the network indicating the participation in the consensus process; and
sign the verified block with one of the pair of participation keys.

18. The node of claim 15, wherein the block is added to the timechain when at least two third of time nodes confirm the block.

* * * * *